US008715868B2

(12) United States Patent
Weidner

(10) Patent No.: US 8,715,868 B2
(45) Date of Patent: May 6, 2014

(54) ELECTROCHEMICAL REMOVAL OF CONTAMINANTS FROM HYDROGEN

(75) Inventor: John W. Weidner, Elgin, SC (US)

(73) Assignee: University of South Carolina, Columbia, SC (US)

(*) Notice: Subject to any disclaimer, the term of this patent is extended or adjusted under 35 U.S.C. 154(b) by 0 days.

(21) Appl. No.: 13/094,258

(22) Filed: Apr. 26, 2011

(65) Prior Publication Data

US 2011/0262818 A1 Oct. 27, 2011

Related U.S. Application Data

(60) Provisional application No. 61/343,293, filed on Apr. 26, 2010.

(51) Int. Cl.
*H01M 8/06* (2006.01)
*H01M 8/04* (2006.01)
*H01M 8/10* (2006.01)

(52) U.S. Cl.
CPC .......... *H01M 8/0687* (2013.01); *H01M 8/0681* (2013.01); *H01M 8/0668* (2013.01); *H01M 8/0662* (2013.01); *H01M 8/04388* (2013.01); *H01M 8/04156* (2013.01); *H01M 8/04164* (2013.01); *H01M 2008/1095* (2013.01); *Y02E 60/50* (2013.01); *C01B 2203/047* (2013.01)
USPC .......... 429/408; 429/405; 429/410; 429/412; 429/423; 429/427; 429/428; 429/448; 429/449

(58) Field of Classification Search
CPC .......... H01M 2008/1095; H01M 8/0668; H01M 8/0681; H01M 8/804388; H01M 8/0662; H01M 8/0687; H01M 8/04156; H01M 8/04164; Y02E 60/50; C01B 2203/047

USPC .......... 429/405, 408, 410, 412, 423, 427, 428, 429/448, 449
See application file for complete search history.

(56) References Cited

U.S. PATENT DOCUMENTS

2002/0071977 A1* 6/2002 Lakshmanan et al. .......... 429/21

OTHER PUBLICATIONS

Balasubramanian et al., "Electrochemical Removal of Carbon Monoxide in Reformate Hydrogen for Fueling Proton Exchange Membrane Fuel Cells", Electrochemical and Solid-State Letters, vol. 13, No. 2, 2010, pp. B5-B7.
Balasubramanian et al., "Formation of SEI on Cycled Lithium-Ion Battery Cathodes: Soft X-Ray Absorption Study", Electrochemical and Solid-State Letters, vol. 5, No. 1, pp. A22-A25.
Baschuk et al. "Carbon Monoxide Poisoning of Proton Exchange Membrane Fuel Cells", Journal of Energy Research, vol. 25, No. 8, Jun. 2001, pp. 695-713.
Carrette et al., "Improvement of CO Tolerance of Proton Exchange Membrane (PEM) Fuel Cells by a Pulsing Technique", Physical Chemistry Chemical Physics, vol. 3, 2001, pp. 320-324.
Dudfield et al., "A Carbon Monoxide PROX Reactor for PEM Fuel Cell Automotive Application", International Journal of Hydrogen Energy, vol. 26, No. 7, Jul. 2001, pp. 763-775.

(Continued)

*Primary Examiner* — Patrick Ryan
*Assistant Examiner* — Ben Lewis
(74) *Attorney, Agent, or Firm* — Dority & Manning, P.A.

(57) ABSTRACT

In certain embodiments of the present disclosure, a proton exchange membrane fuel cell is described. The fuel cell includes a twin-cell electrochemical filter. A flow of reformate $H_2$ and pulse potential are switched between each respective filter cell such that when CO-contaminated $H_2$ is fed to one filter cell, generally simultaneously a pulse potential is applied to the other filter cell.

10 Claims, 13 Drawing Sheets

(56) References Cited

OTHER PUBLICATIONS

Echigo et al., "A Study of CO Removal on an Activated Ru Catalyst for Polymer Electrolyte Fuel Cell Applications", Applied Catalysis A: General, vol. 251, No. 1, Sep. 2003, pp. 157-166.

Echigo et al., "CO Removal from Reformed Gas by Catalytic Methanation for Polymer Electrolyte Fuel Cell Applications", Journal of Chemical Engineering of Japan, vol. 37, No. 1, 2004, pp. 75-81.

Fedkiw et al., "Pulsed-Potential Oxidation of Methanol", Journal of Electrochemical Society, vol. 135, No. 10, Oct. 1988, pp. 2459-2465.

Gasteiger et al., "Carbon Monoxide Electrooxidation on Well-Characterized Platinum-Ruthenium Alloys", The Journal of Physical Chemistry, vol. 98, No. 2, 1994, pp. 617-625.

Gottesfeld et al., "A New Approach to the Problem of Carbon Monoxide Poisoning in Fuel Cells Operating at Low Temperatures", Journal of Electrochemical Society, vol. 135, No. 10, Oct. 1988, pp. 2651-2652.

Ha, "The Fabrication and Performance of a Poly(Dimethylsiloxane) (PDMS)-Based Microreformer for Application to Electronics", International Journal of Hydrogen Energy, vol. 33, No. 8, Apr. 2008, pp. 2059-2063.

Kasaoka et al., "Reaction Performance of Methanation of Carbon Monoxide and Carbon Dioxide over Supported Ruthenium Catalysts", Kagaku Kogaku Ronbunshu, vol. 17, No. 4, 1991, pp. 732.

Lakshmanan et al., "Poly Etheretherketone Membranes for Elevated Temperature PEMFCs", Electrochemical and Solid-State Letters, vol. 6, No. 12, 2003, pp. A282-A285.

Lee et al., "Electrocatalysis of CO Tolerance in Hydrogen Oxidation Reaction in PEM Fuel Cells" Electrochimica Acta, 44, 1999, pp. 3283-3293.

Majlan et al., "Hydrogen Purification Using Compact Pressure Swing Adsorption System for Fuel Cell", International Journal of Hydrogen Energy, vol. 34, No. 6, Mar. 2009, pp. 2771-2777.

Manesilp et al., "Selective CO Oxidation over PT/Alumina Catalysts for Fuel Cell Applications", Applied Catalysis B: Environmental, vol. 37, 2002, pp. 17-21.

Oetjen et al., "Performance Data of a Proton Exchange Membrane Fuel Cell Using $H_2$/CO as Fuel Gas", Journal of the Electrochemical Society, vol. 143, No. 12, Dec. 1996, pp. 3838-3842.

Oh et al., "Carbon Monoxide Removal from Hydrogen-Rich Fuel Cell Feedstreams by Selective Catalytic Oxidation", Journal of Catalysis., vol. 142, Jul. 1993, pp. 254-262.

Sethuraman at al., "Quantifying Desorption and Rearrangement Rates of Carbon Monoxide on a PEM Fuel Cell Electrode", Electrochimica Acta, vol. 54, No. 23, Sep. 2009, pp. 5492-5499.

Song et al., "High-Performance PEMFCs at Elevated Temperatures Using Nafion 112 Membranes", Journal of Electrochemical Society, vol. 152, No. 3, Jan. 2005, pp. A539-544.

Vannice, "The Catalytic Synthesis of Hydrocarbons from $H_2$/CO Mixtures over the Group VIII Metals: II. The Kinetics of the Methanation Reaction over Supported Metals", Journal of Catalysis, vol. 37, No. 3, Jun. 1975, pp. 462-473.

Vidakovic et al., "The Use of CO Stripping for in Situ Fuel Cell Catalyst Characterization", Electrochimica Acta, vol. 52, No. 18, May 2007, pp. 5606-5613.

Vogel et al., "Reaction Pathways and Poisons9—II: The Rate Controlling Step for Electrochemical Oxidation of Hydrogen on Pt in Acid and Poisoning of the Reaction by CO", Electrochimica Acta, vol. 20, No. 1, Jan. 1975, pp. 79-93.

\* cited by examiner

ELECTROCHEMICAL REMOVAL OF CONTAMINANTS FROM HYDROGEN

CROSS-REFERENCE TO RELATED APPLICATION

The present application is based on and claims priority to U.S. Provisional Application Ser. No. 61/343,293 having a filing date of Apr. 26, 2010, which is incorporated by reference herein.

BACKGROUND

Carbon monoxide (CO) in hydrogen reformed from carbon based fuels is known to degrade the performance of a proton exchange membrane fuel cell (PEMFC) by poisoning the anode active sites, as shown in Reaction 1:

$$Pt+CO \rightarrow Pt-CO \qquad [1]$$

To mitigate the detrimental effects of CO on the performance of a PEMFC, researchers have explored ways to modify fuel cell operation including using elevated temperatures (e.g., 120° C.), air bleeding, in situ voltage pulsing, and the like. Even with these techniques, fuel cells may not tolerate the concentration level of CO coming out of a reformer, which is typically 0.1-1% (1000-10,000 ppm). To reduce the CO concentration in reformate $H_2$ to parts per million levels, methods such as pressure swing adsorption, preferential oxidation, or catalytic methanation can be used. However, volume, weight, power, and fuel-efficiency penalties may be substantial when using these methods, particularly for small-scale fuel cell systems. A single-cell electrochemical CO filter external to the fuel cell has been previously proposed. This filter lowers the CO concentration by periodically oxidizing the adsorbed CO via the following reaction 2:

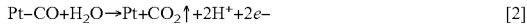

$$Pt-CO+H_2O \rightarrow Pt+CO_2\uparrow+2H^++2e- \qquad [2]$$

However, low exit CO concentrations and a high selectivity of CO to $H_2$ oxidation could not be simultaneously achieved due to the reformate continuously flowing through the filter cell during oxidation.

As such, a fuel cell that can effectively the issue of CO degradation in performance would be desirable. A method that utilizes such fuel cells would also be beneficial.

SUMMARY

Aspects and advantages of the disclosure will be set forth in part in the following description, or may be obvious from the description, or may be learned through the practice of the disclosure.

In certain embodiments of the present disclosure, a proton exchange membrane fuel cell is described. The fuel cell includes a twin-cell electrochemical filter. A flow of reformate $H_2$ and pulse potential are switched between each respective filter cell such that when CO-contaminated $H_2$ is fed to one filter cell, generally simultaneously a pulse potential is applied to the other filter cell.

In still other embodiments of the present disclosure, a method to reduce CO concentration in reformate $H_2$ is described. The method includes directing a flow of reformate H2 to a proton exchange membrane fuel cell. The fuel cell includes a twin-cell electrochemical filter. A flow of reformate $H_2$ and pulse potential are switched between each respective filter cell such that when CO-contaminated $H_2$ is fed to one filter cell, generally simultaneously a pulse potential is applied to the other filter cell.

These and other features, aspects and advantages of the present disclosure will become better understood with reference to the following description and appended claims.

BRIEF DESCRIPTION OF THE DRAWINGS

A full and enabling disclosure, including the best mode thereof, directed to one of ordinary skill in the art, is set forth more particularly in the remainder of the specification, which makes reference to the appended figures in which.

DETAILED DESCRIPTION

Reference now will be made in detail to various embodiments of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment, can be used on another embodiment to yield a still further embodiment. Thus, it is intended that the present disclosure covers such modifications and variations as come within the scope of the appended claims and their equivalents.

Figure 4:
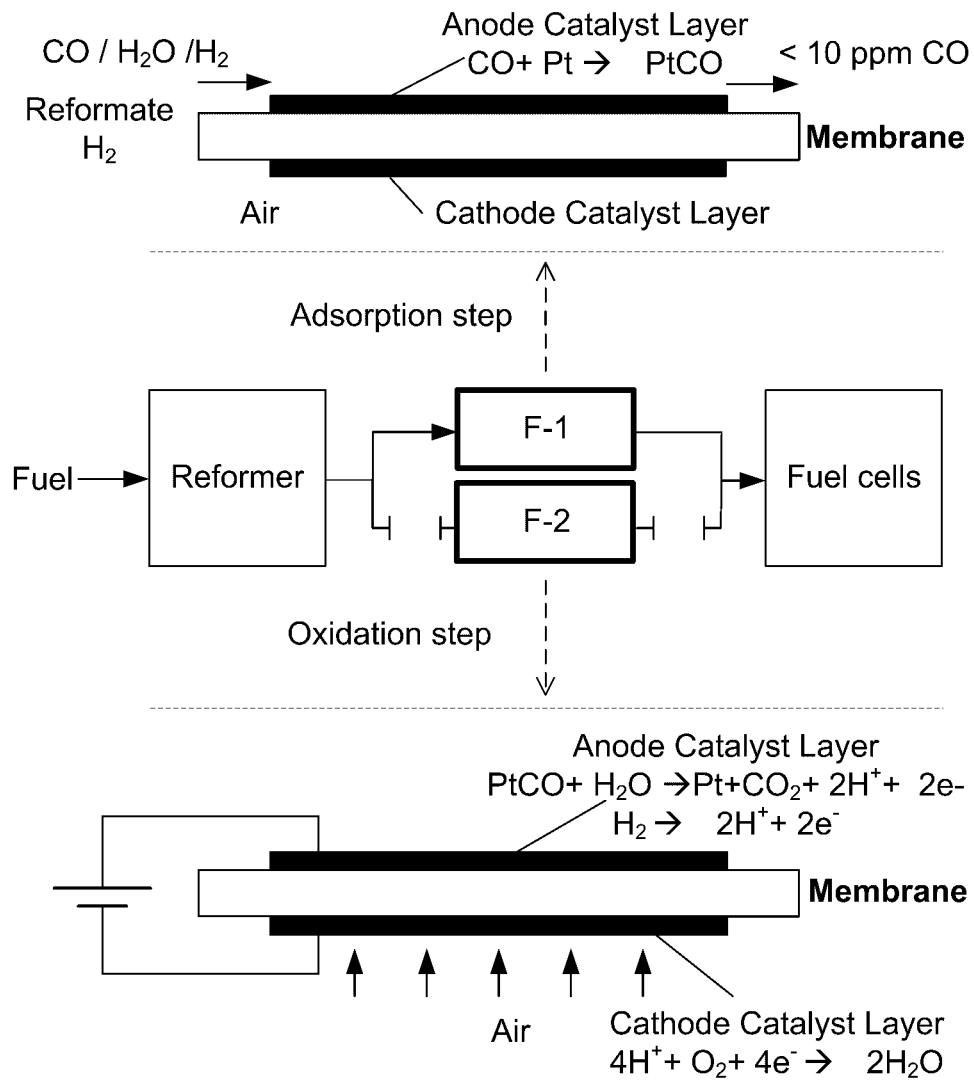
FIG. 4 illustrates a schematic description of a twin cell filter setup describing the oxidation and adsorption steps of each of the filter cells in accordance with certain aspects of the present disclosure.

The present disclosure describes a twin-cell electrochemical filter that can reduce CO concentration in reformate hydrogen. As illustrated in FIG. 4, in twin cell filter design of the present disclosure, two filter cells (F-1 and F-2) undergo alternating cycles of CO adsorption and oxidation. FIG. 4 illustrates a twin-cell electrochemical CO filter in operation. During adsorption mode, CO contaminated reformate hydrogen is passed into the anode chamber of F-1 at open circuit. CO in reformate adsorbs on the Pt anode, as in the reaction 1.

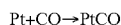

$$Pt+CO \rightarrow PtCO \qquad [1]$$

The gas exiting the anode of F-1, after losing most of the CO to adsorption on the filter's Pt anode, would have a PEMFC tolerable CO concentration. Meanwhile, F-2 under oxidation mode is maintained at a potential to oxidize the adsorbed CO as in reaction 2. The oxidation of adsorbed CO leads to the regeneration of Pt. This avails active sites for CO adsorption during the adsorption mode of the next cycle.

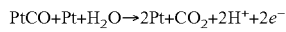

$$PtCO+Pt+H_2O \rightarrow 2Pt+CO_2+2H^++2e^- \qquad [2]$$

During oxidation mode, hydrogen co-adsorbed or present in the bulk of the cell also undergoes oxidation as in the reaction 3.

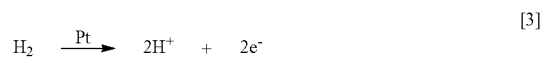

$$H_2 \xrightarrow{Pt} 2H^+ + 2e^- \qquad [3]$$

The anode gas flow of the F-2 cell in oxidation mode is stopped to minimize the hydrogen oxidation loss. The corresponding cathode reaction is,

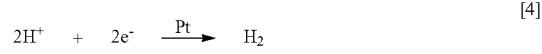

$$2H^+ + 2e^- \xrightarrow{Pt} H_2 \qquad [4]$$

After certain duration (referred to herein as the switching time), the reformate flow is switched to F-2 for CO adsorption while a pulse potential is applied to F-1 for oxidizing the CO adsorbed from the previous cycle. The switching time between the cycles of adsorption and oxidation is chosen such that the CO concentration at the filter exit is tolerable for fuel cells as well as the anode is regenerated to capture CO from the reformate hydrogen. The additional cell in the twin-cell design is leveraged to provide a continuous stream of H$_2$, while limiting the oxidation loss of H$_2$ to that trapped within the anode volume of the cell under oxidation mode.

The present disclosure demonstrates a twin-cell filter operation with about 1,000 ppm to about 10,000 ppm of CO in H$_2$. In that, it was observed that lower bound of the switching time is limited by the choice of oxidation potential and upper bound of switching time is determined by the desired CO concentration at the filter exit. The choice of switching time is also likely governed by the electrochemical filter's size, feed CO concentration and filter's CO adsorption capacity. The results of experiments show the effect of experimental parameters flow rate, operating temperature, catalyst loading and inlet gas concentration and validate a fixed bed adsorption model from literature to predict a suitable switching time from the CO breakthrough curves of a filter cell for a certain configuration.

To model the dynamics CO adsorption on the Pt anode, the filter anode was treated as a fixed bed adsorber under isothermal conditions. Assuming the dispersion effects are negligible, a differential material balance for CO along the serpentine channels of the filter is written as, $$\overline{V}\frac{\partial C}{\partial V_b} + \frac{\partial C}{\partial t} + \frac{\partial Q}{\partial t} = 0 \qquad [5]$$

$$Q = 0, \text{ at } t = 0 \qquad [6]$$

$$C = 0, \text{ at } t = 0 \qquad [7]$$

$$Q = C_O, \text{ at } V_b = 0 \qquad [8]$$

Where, C and Q correspond to the concentration of CO in the bulk and adsorbed phase, respectively. The CO fed into the anode compartment of the filter diffuses through the gas diffusion layer and then adsorbs on the Pt anode at open circuit.

The rate of adsorption is limited by various resistances: including external film diffusion resistance, internal pore diffusion resistance, surface diffusion resistance and surface adsorption resistance offered by pre-adsorbed hydrogen or CO. Assuming all these resistances can be lumped to a linear driving force and the resultant rate equation is written as, $$\frac{\partial Q}{\partial t} = k(C - Q) \quad [9]$$

The parameter 'k' is defined as the inverse of sum of all resistances slowing down the adsorption of CO on a Pt active site. The adsorbed phase CO concentration is related to the bulk phase CO concentration through the following equation.

$$K = \frac{Q^s}{C_O} \quad [10]$$

Where, $C_O$ represents the feed CO concentration and $Q^s$ represents the maximum CO adsorption capacity of the filter.

Solving equations 5-10 for the CO concentration at the exit of the filter, a solution is obtained.

$$\frac{C}{C_O} = 1 - \exp(-\tau) \int_0^{k\left(\frac{V_b}{V}\right)} \exp(-\beta) I_0(2\sqrt{\beta\tau}) d\beta \quad [11]$$

$$\tau = \frac{k}{K}\left(t - \frac{V_b}{V}\right) \quad [12]$$

The solution has two parameters, of which 'K' defined in equation 10 as the ratio of maximum adsorbed phase CO concentration to the feed CO concentration, determines the volume of gas required to saturate an ideal filter anode. An ideal filter is one in which the anode is saturated before any CO exits the filter. Therefore, the concentration of CO at the exit of a filter will have a step change from equilibrium level to the feed level after the saturation time. However, due to various resistances, the change in concentration will be gradual reflecting the dynamics inside the filter. The shape of the gradual change in the exit CO concentration, which is referred as breakthrough (BT) curve, is captured by the lumped mass transfer coefficient 'k'. The parameter k is estimated for a filter is obtained by fitting the equation 11 against an experimentally obtained BT curve.

The present disclosure can be better understood with reference to the following examples.

EXAMPLES

Example 1

Filter Cell Construction

The electrodes (E-TEK) used in the filter cells had an active area of 10 cm$^2$ and a catalyst loading of 0.5 mg/cm$^2$ of platinum. The channels in the anode flow fields had a volume of 0.458 cm$^3$. The membrane electrode assemblies for the filter cells were prepared and the gas flow, temperature, and pressure were controlled using a test station and hardware from Fuel Cell Technologies, Inc. All experiments were carried out at 25° C. and 1 atm. A CO concentration of 1000 ppm in $N_2$ with no humidification flowing at 100 cm$^3$/min was used as the CO source for the anode. The cathode, with fully humidified 4% $H_2/N_2$ gas flowing at 40 cm$^3$/min, acted as the counter and reference electrodes. All of the gases used were procured from Praxair, Inc. The CO concentration in the gas stream was quantified using an online gas chromatograph (Buck Scientific, model 910) equipped with a calibrated flame ionization detector. The electrochemical experiments were carried out with a potentiostat (Bio-Logic, model VMP3).

CO-SCV

CO stripping cyclic voltammetry (CO-SCV) was used to quantify and remove the CO adsorbed on the anode of the filter cell. This was done by scanning the filter anode between 0.05 and 1.0 V for two cycles at a rate of 50 mV/s. The adsorbed CO was quantified by integrating the charge under the CO oxidation peak corrected for the background current.

CO Breakthrough Curve

The CO breakthrough curves were generated by exposing a CO-free filter cell at open circuit to CO/$N_2$ for a period of time (i.e., absorption time) and by analyzing the gas exiting the filter anode for CO concentration using a gas chromatograph flame ionization detector (GC-FID). Then, the CO adsorbed on the filter anode was quantified using CO-SCV. After removing the adsorbed CO by CO-SCV, the experiment was repeated for different adsorption times.

CO Oxidation

To understand the effect of the applied pulse potential during the oxidation mode, the filter anode was exposed to CO/$N_2$ for a period of time. Then, a pulse potential was applied for the same period of time, and the current response was monitored during the period. After the pulse, the CO adsorbed on the filter anode was quantified using CO-SCV. This experiment was repeated for pulses of different potentials.

Filter Operation

To demonstrate the filter operation, a CO/$N_2$ stream was fed to the anodes of the two filter cells, and the anode exits were connected to the GC-FID. A relay mechanism was used to switch gas flow between the filters and to synchronize the adsorption and oxidation modes of the filters according to a preset switching time. The synchronized twin-cell filter experiments were carried out for different switching times and for a fixed oxidation potential.

Results and Discussion

CO Breakthrough Curve—

Figure 1:
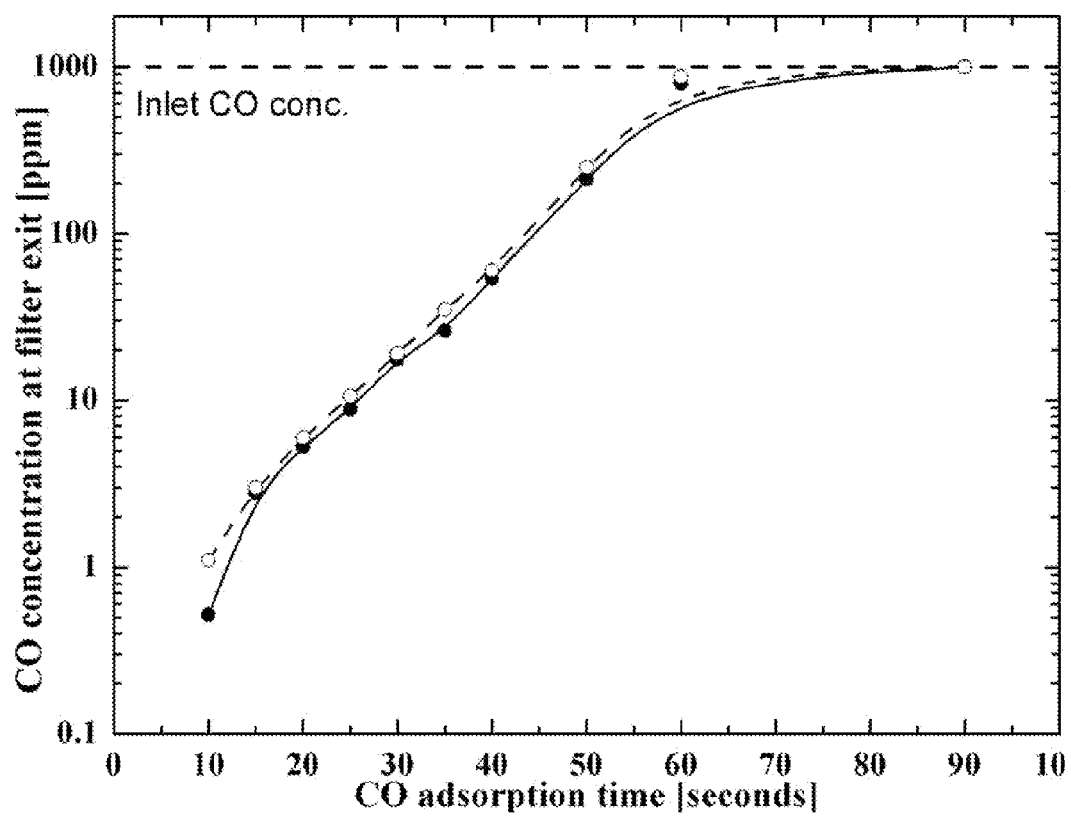
FIG. 1 illustrates CO concentration at the anode exit of the filter cells measured as a function of adsorption time of 1000 ppm of $CO/N_2$ flowing at 100 cm³/min, 25° C., and 1 atm (closed symbols, filter 1; open symbols, filter 2) in accordance with certain aspects of the present disclosure.

The CO breakthrough curves for each of the two filter cells are shown in FIG. 1. The concentration of CO in the exit stream increased from approximately 1 ppm after 10 s to 10 ppm after 20 s and, finally, to 1000 ppm (i.e., inlet concentration) after 90 s. The difference between the inlet and exit CO concentrations, as measured by the GC-FID, was equal to the amount of adsorbed CO estimated from CO-SCV, confirming the accuracy of the data. The breakthrough curves for CO in $N_2$ were similar to those for CO in $H_2$, confirming that CO adsorption is not greatly affected by the presence of $H_2$. This is consistent with conventional though which shows that CO adsorption dominates hydrogen adsorption at low temperatures. The net CO adsorption capacity of each filter anode, as determined from CO-SCV from a CO saturated filter anode, was 4.65 µmol (0.465 µmol/cm$^2$). An ideal filter, with no resistance to diffusion and adsorption, would adsorb all CO molecules entering the filter before any CO molecule exits the filter. Hence, a step change in the exit CO concentration from zero to the inlet concentration would be observed. For these filter cells under these flow conditions, the step change would have occurred after 60 s. The observed exponential increase in the exit CO concentration before reaching a steady-state value indicates a finite CO diffusion and adsorption rate. For an adsorption time of 20 s, the exit CO concentration was less than 10 ppm, and the corresponding coverage of the active sites was 0.155 μmol/cm², which was 33% of the CO adsorption capacity. Therefore, 20 s was chosen as the base case switching condition for demonstrating filter operation.

CO Oxidation—

Figure 2:
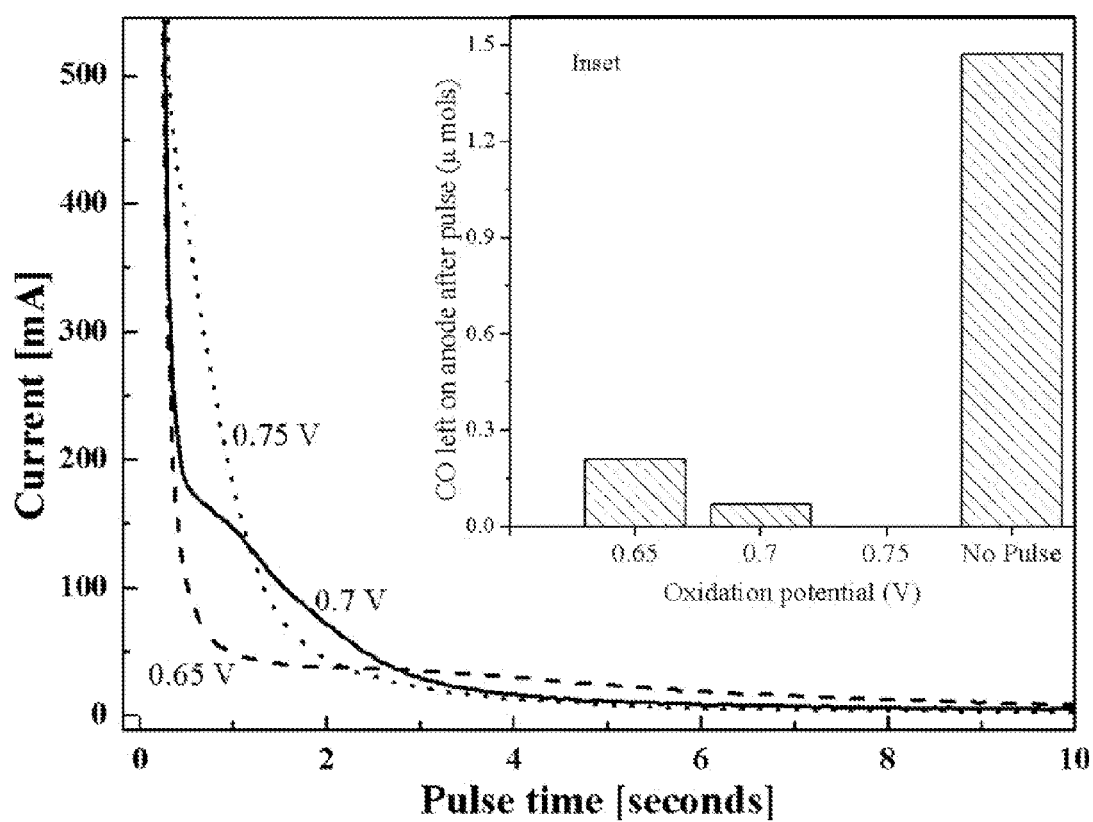
FIG. 2 illustrates current response of the filter anode exposed to 1000 ppm of $CO/N_2$ for 20 s at 100 cm³/min flow rate, 25° C., and 1 atm for different oxidation potentials of 0.65, 0.7, and 0.75 V vs 4% $H_2/N_2$ at the cathode (the inset compares the CO left adsorbed on the filter anode immediately after the pulse and when no pulse was applied) in accordance with certain aspects of the present disclosure.

To determine the suitable pulse potential for a switching time of 20 s, the oxidation experiments were carried out for 20 s pulses of potentials 0.65, 0.7, and 0.75 V followed by CO-SCV. FIG. 2 shows the current response of the filter anode, which was pre-exposed to $CO/N_2$ for 20 s. The current response shows two major features: (i) The initial sharp decline observed in the first 0.5 s is mainly attributed to the charging of the electrode double-layer capacitance, and (ii) the current decay afterward is attributed to the CO oxidation current. The amount of CO not oxidized by the pulse was quantified by integrating the CO oxidation peak from the CO-SCV results. The inset in FIG. 2 compares the CO left on the anode after the pulse to the initial CO adsorbed on the anode after 20 s of adsorption. Pulses of 0.65 and 0.7 V oxidized 85 and 95% of the CO adsorbed in 20 s, respectively, whereas a 0.75 V pulse oxidized the entire CO adsorbed. Because a complete removal of adsorbed CO occurred at 0.75 V, this was chosen as the oxidation potential for filter demonstration.

Filter Operation—

Figure 3:
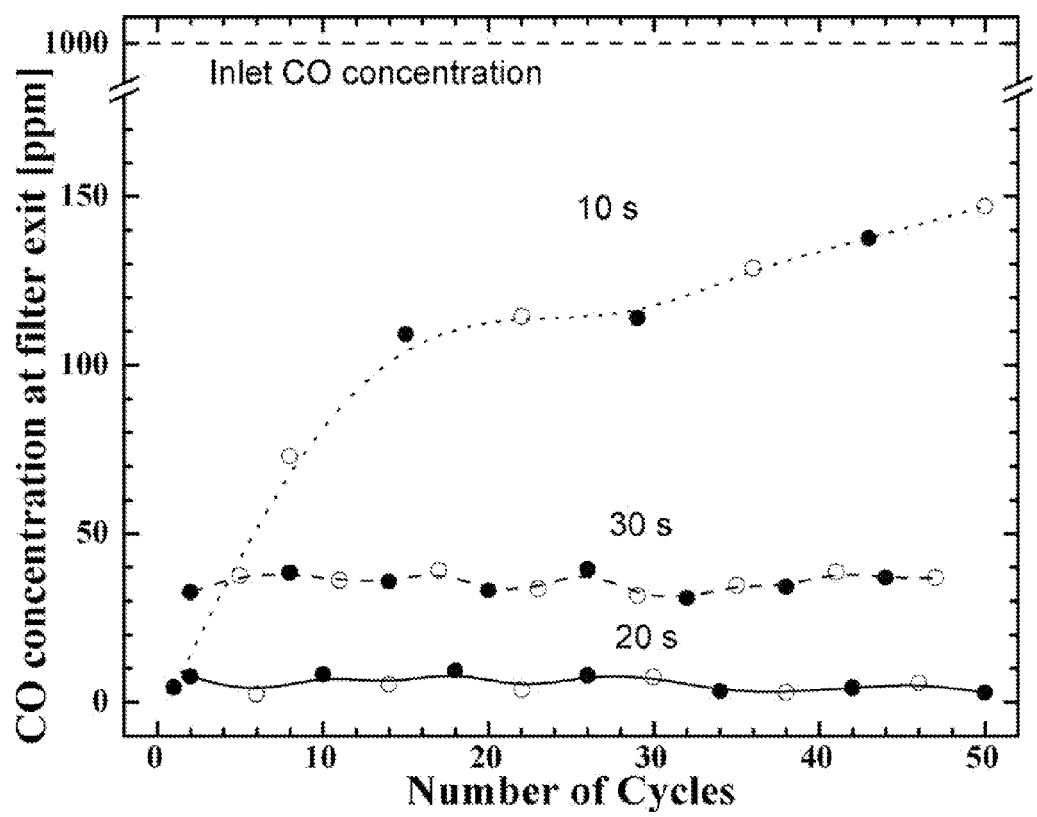
FIG. 3 illustrates CO concentration of the gas exiting the filter operated with a pulse potential of 0.75 V vs 4% $H_2/N_2$ at the cathode (the inlet CO concentration was 1000 ppm in $N_2$ flowing at 100 cm³/min for different switching times at 25° C. and 1 atm (closed symbols, filter 1; open symbols, filter 2)) in accordance with certain aspects of the present disclosure.

To evaluate a continuous filtering of CO in a stream, two filter cells were connected. The filter was operated at a pulse potential of 0.75 V and at different switching times of 10, 20, and 30 s to see if the concentration of CO in a continuous stream of $CO/N_2$ can be controlled using the twin-cell electrochemical filter design. The gas was sampled and analyzed with GC-FID at the end of the adsorption time of a cycle, in which the CO concentration was maxima, and the results were plotted (see FIG. 3). For 20 and 30 s switching times, the exit CO concentration was around 10 and 40 ppm, respectively, which was consistent with the adsorption breakthrough curve (see FIG. 1). The steady concentration indicates the recyclability of active sites during the oxidation mode. However, for the 10 s switching time, the CO concentration increased from less than 10 ppm after the first cycle to 150 ppm with continuous operation.

Despite a shorter adsorption time, the increase in the exit CO concentration was attributed to the incomplete recovery of the active sites through the oxidation of the adsorbed CO. The incomplete recovery of the active sites led to a decrease in the CO adsorption capacity of the filter during the adsorption mode with time. Despite the oxidation of most of the CO in the first 10 s (see FIG. 2), the CO oxidized and the active sites recovered in the last 10 s are important for a steady filter performance. The filter performance for 20 and 30 s switching times shows the importance of adsorption time in achieving the desired CO concentration, whereas the 10 s switching time shows the limitation of a low switching time in recovering the electrode active sites during oxidation.

The difference between filtering CO from $H_2$ and filtering CO from $N_2$ is the additional oxidation due to hydrogen. However, only $H_2$ trapped in the cell during the oxidation step is consumed. Therefore, the parasitic loss of $H_2$ from a reformate stream can be calculated from the operating parameters of the filter and fuel cells. Consider, for example, a twin-cell filter for removing CO from a reformate stream (50% $H_2$, 1000 ppm CO, and balance inert gases) feeding a fuel cell. Assume that each filter cell has the same active area as the fuel cell, so the ratio of the twin-cell filter area to the fuel cell stack area is 2:1. Furthermore, assume that the fuel cell runs at 85% utilization and at a current density of 0.6 A/cm². Therefore, the flow of hydrogen through the filter and the fuel cell is 3.7 μmol/cm² s. For a filter operating as demonstrated here (i.e., switching time of 20 s), the average CO oxidation rate is 0.00775 μmol/cm² s (i.e., 0.155 μmol CO/cm² divided by 20 s). Hydrogen oxidation involves hydrogen atoms adsorbed onto 67% of the active sites, those not covered by CO (0.155 μmol $H_2$/cm²), and hydrogen in the gas phase (1.02 μmol $H_2$/cm² because, for this reformate stream, 10.2 μmol $H_2$ occupies the 0.458 cm³ volume of the 10 cm² cell). Therefore, the average hydrogen oxidation rate is 0.0588 μmol/cm² s, and the CO:$H_2$ selectivity is 1:7.6 (i.e., 0.000775:0.0588). This corresponds to a loss of ~1.5% of hydrogen in the reformate stream. If the reformate stream was a more realistic 0.5% CO (5000 ppm), and the capacity per area of the filter was increased by a reasonable factor of 5, the loss of hydrogen would still be less than 5%.

CONCLUSIONS

The present disclosure describe a twin-cell filter design to decrease the CO concentration in nitrogen from 1000 to 10 ppm in a gas stream flowing at 100 cm³/min through 10 cm² filter cells. It was observed that the performance of the filter is usually determinable from the adsorption breakthrough curve. For example, the exit CO concentration decreased with a decrease in switching time from 30 to 20 s, consistent with the breakthrough curve. However, a limit is reached such that a small switching time is not sufficient to remove CO during the oxidation step. Therefore, at a switching time of 10 s, the CO concentration exiting the filter eventually surpassed that of the 20 s switching time. The parasitic loss of hydrogen from a corresponding reformate stream was estimated to be 1.5%.

Example 2

The membrane electrode assembly (MEA) used was procured from Lynntech Inc. The MEA has two platinum black electrodes, each with a geometrical area of 25 cm², coated on either side of a Nafion-115 membrane. The MEAs were assembled into filter cells hardware with triple serpentine channeled graphite flow fields (Fuel Cell Technologies Inc.). The gas flow, temperature and pressure were monitored using a test station (Fuel Cell Technologies Inc.), while the relay mechanism used to switch gas flow and potentiostat channels was developed in house. The electrochemical experiments were carried out with a potentiostat (Mfrs: Bio-logic, Model: VMP3). CO concentration of the gas stream was measured using an online gas chromatograph (GC) (Mfrs: Buck scientific, Model: 910) equipped with a flame ionization detector (FID). All the gases used were procured from Praxair.

The MEAs assembled into filter cell hardware were initialized and humidified by following a break-in procedure, in which each of the filter cells were operated like a fuel cell for 8 hours at 75° C. and 0.5 V with pure hydrogen and oxygen as fuel and oxidant feeds, respectively. A polarization curve was taken to characterize the MEA performance and compared it to that of a standard MEA. The value of QS is the maximum CO adsorbed on the electrode per unit volume of the anode for certain experimental conditions. For this, the electrode was exposed to CO source gas for certain duration sufficient enough to saturate the filter anode. Then 100% humidified $N_2$ was fed for a minute to purge out the excess CO. The CO adsorbed on the filter anode was quantified using CO stripping cyclic voltammetry (SCV). The CO covered anode was scanned from 0.05 to 1.1 V at a scan rate of 50 mV/s for two cycles, while 4% $H_2/N_2$ flowing through the filter cathode acted as the counter and reference electrodes for the SCV. The resulting CO oxidation peak during the first forward sweep was corrected for background current by subtracting the current of forward sweep of the second cycle from that of the first cycle. The background current corrected integral area under the CO oxidation current peak over time indicates the CO adsorbed on the filter anode.

CO Break-Through Estimation—

For determining the CO breakthrough, a clean filter cell was exposed to the CO containing gas and the change in the CO concentration in the gas at the filter anode's exit with time was quantified using GC-FID. Following this the adsorbed CO was oxidized and quantified using CO-SCV.

Experiment for Choosing Oxidation Potential—

The suitable potential to oxidize the adsorbed CO, within the switching time estimated from the CO breakthrough curves, was obtained by carrying out a combination of chronoamperometry and CO-SCV on a CO covered filter anode. The clean filter anode was exposed to CO source gas for a certain switching time and then the gas flow was stopped. With 4% $H_2/N_2$ flowing through the cathode, a pulse potential, for e.g. 0.7 V, was applied for a time interval, followed by a CO-SCV to quantify the leftover CO and recovered active sites. The lowest potential at which all of the adsorbed CO can be oxidized within the switching time is chosen as the suitable oxidation potential.

Filter Setup and Operation—

In a twin-cell filter, each of the cells undergo alternating cycles of adsorption and oxidation. To demonstrate the operation of a filter, a single filter cell was used and simulated the cycles of CO adsorption and oxidation. A set of solid state relays were used to switch gas flows and potentiostat, according to preset switching time. The gas stream exiting filter anode was sampled and the CO concentration in it was measured using GC-FID. The filter experiments were carried out for various switching times and exit CO concentrations were measured.

Results and Discussions

Figure 5:
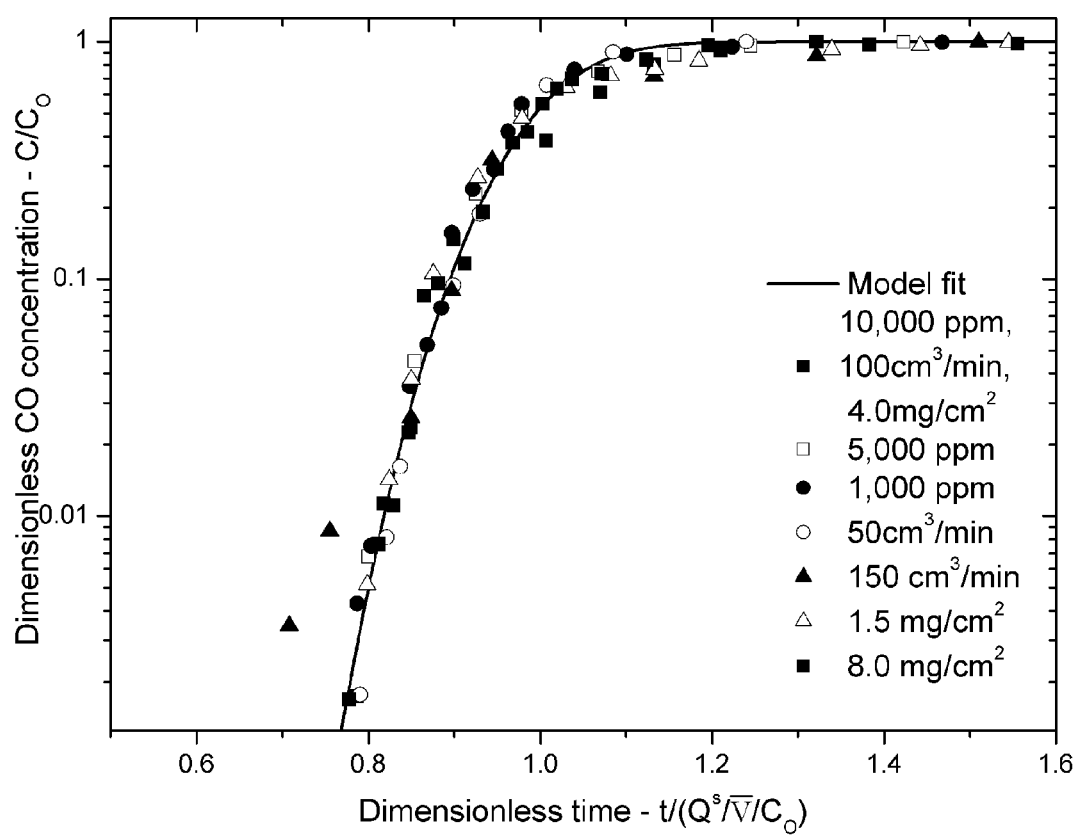
FIG. 5 illustrates a normalized CO break through at the exit of a filter cell plotted against the corresponding normalized time (symbols represent experimental data and the line represents the model fit for a single mass transfer coefficient) in accordance with certain aspects of the present disclosure.

To amplify the effects observed in low CO concentration part of the BT curve, the model discussion in comparison with experimental data is presented on a log scale with respect to the CO concentration at the filter exit. As the literature says, 10 ppm is the CO concentration above which an unaided fuel cell will lose its performance significantly, the 10 ppm was considered the break through point. FIG. 5 shows the BT curves of CO concentration at the exit of a filter for different adsorption times. The symbols represent BT curves obtained from experiments for different CO concentrations (10000, 5000 and 1000 ppm), flow rates (50, 100 and 150 cc/min) and catalyst loading (1.5, 4.0 and 8.0 mg of $Pt/cm^2$ of electrode) on a dimensionless scale. The CO concentration at the filter exit is normalized with respect to feed CO concentration. The time scale was normalized with respect to bed saturation time. Bed saturation time is the ratio of molar bed capacity, which is estimated from the CO-SCV for a given feed CO concentration, to the molar flow rate. The line represents the model fit of the equation [11] for the normalized data. The agreement of the model with the data shows that the model can be collapsed to one unknown parameter (i.e. mass transfer coefficient=9.65), which is estimated by fitting against a CO adsorption BT curve. The two points that lie outside the model fit corresponds to the break through curve of 150 cc/min case. The deviation is attributed to the amplification of experimental error in the absolute time scale.

CO Concentration Effects—

Figure 6:
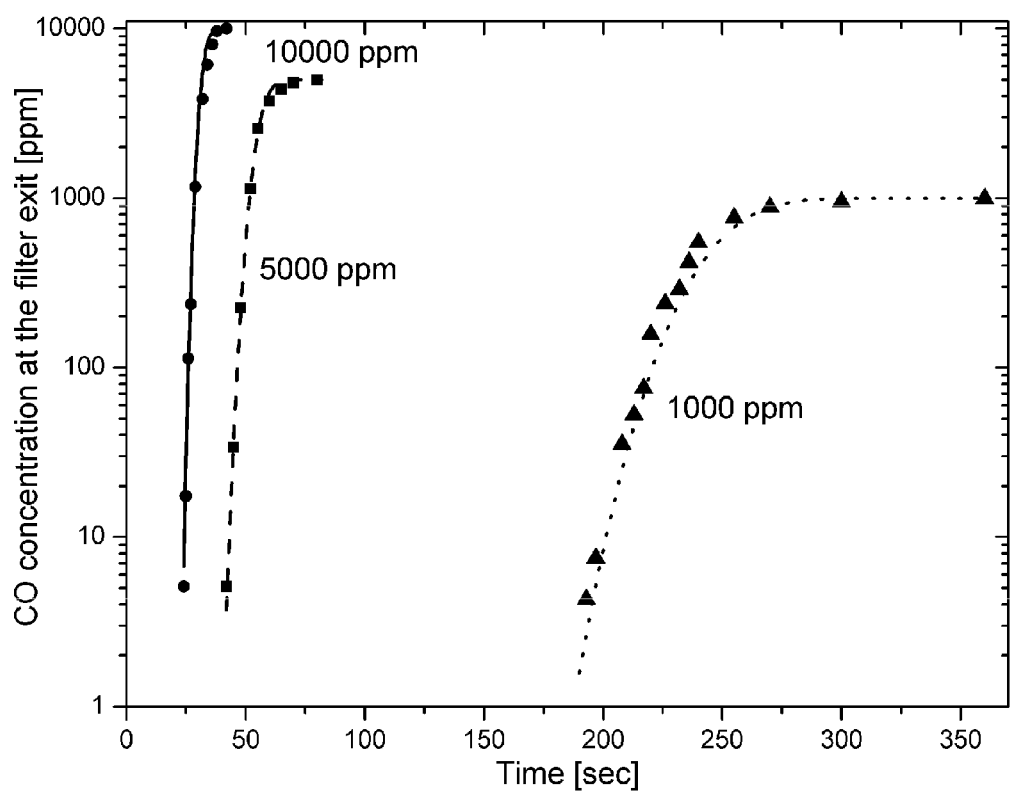
FIG. 6 illustrates CO adsorption break through curves showing the effect of different feed CO concentration in hydrogen for a flow rate of 100 cm³/min at 25° C. and 1 atm pressure on a filter cell with a Pt-black loading of 4 mg/cm² and an electrode area of 25 cm² (symbols and lines, ▲ and dotted—1000 ppm, ■ and squared—5000 ppm and ● and straight—10000 ppm, represent experimental data and the model fit of the equation 11, respectively) in accordance with certain aspects of the present disclosure.

The BT curves for different CO concentrations in hydrogen flowing at 100 $cm^3$/min, 25° C. and 1 atm. pressure in an electrode of 25 $cm^2$ area and a Pt-black loading of 4 $mg/cm^2$ are shown in the FIG. 6. The CO concentration at the exit increased from near 10 ppm to the respective feed concentration. For 10,000, 5000 and 1000 ppm $CO/H_2$ case, the break through occurred at around 25, 45 and 190 seconds and leveled the feed concentration at around 43, 90 and 285 seconds, respectively. The line shows the model fit for the respective feed concentration predicted using a single mass transfer coefficient fitted for the entire set of data shown in the FIG. 5. The agreement of the model fit of the entire set of data with individual experimental data shows that the filter adsorption performance scales with the CO concentration and does not show significant deviation in mass transfer resistance with change in CO concentration.

CO Flow Rate Effects—

Figure 7:
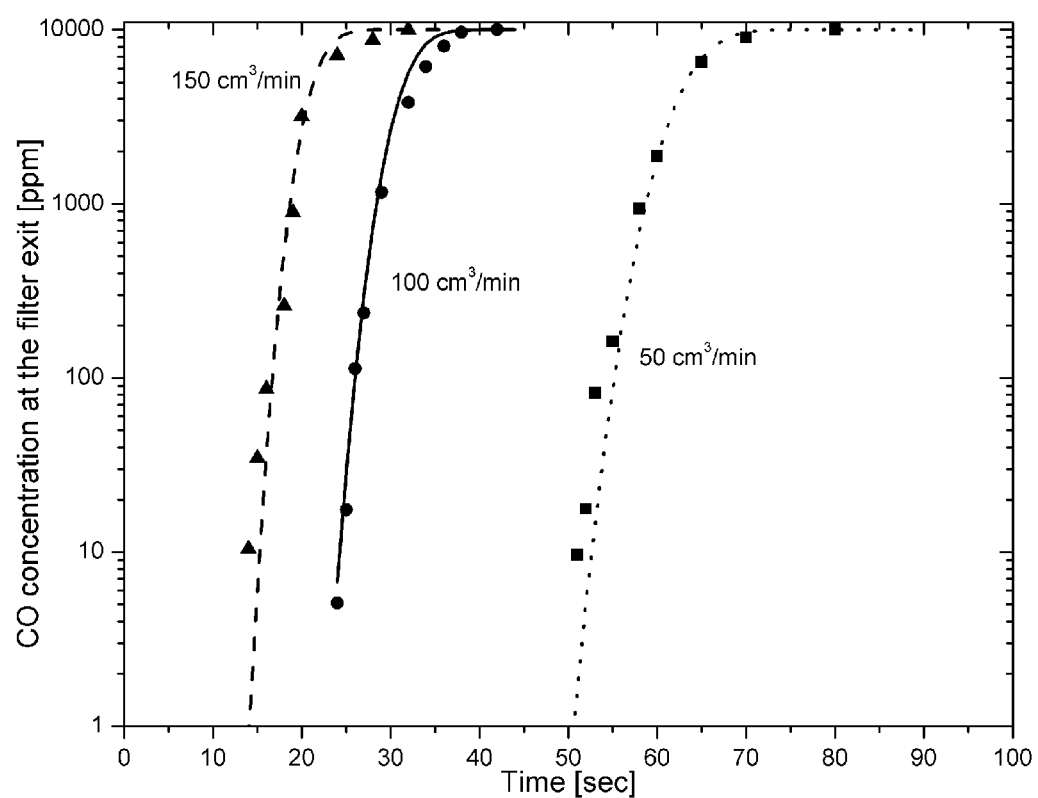
FIG. 7 illustrates CO adsorption break through curves showing the effect of different flow rates for a feed CO concentration of 10000 ppm in hydrogen at 25° C. and 1 atm pressure on a filter cell with a Pt-black loading of 4 mg/cm² and an electrode area of 25 cm² (symbols and lines, ■ and dotted—50, ● and straight—100 and ▲ and dashed –150 cm³/min represent experimental data and the model fit of the equation 11, respectively) in accordance with certain aspects of the present disclosure.

The FIG. 7 shows the breakthrough curves for flow rates of 50, 100 and 150 $cm^3$/min for an inlet concentration of 10,000 ppm $CO/H_2$ at 25° C. and 1 atm. pressure in an electrode of 25 $cm^2$ area and a Pt-black loading of 4 $mg/cm^2$. For the different flow rates 50, 100 and 150 $cm^3$/min flow rate the CO breakthrough started at around 50, 25 and 15 s and reached a steady state to the feed concentration level at around 80, 43 and 30 s in the respective order. A decrease in breakthrough time scales with an increase in the flow rate. This is consistent with the decrease in the ideal bed saturation time with the increase in the molar flow rate for a fixed bed capacity. In a packed column, an increase in gas velocity decreases the film thickness and thereby reducing the mass transfer resistance of the system. If the mass transfer rate in filter is limited by the film transfer resistance then increase in flow rate should improve the mass transfer. However, a mass transfer coefficient could fit BT curves for different flow rates indicate that mass transfer is less dependent on external film thickness. This suggests that the dominant resistance comes from either or both of the internal mass transfer resistance and surface reaction resistance.

Effects of Catalytic Loading—

Figure 8:
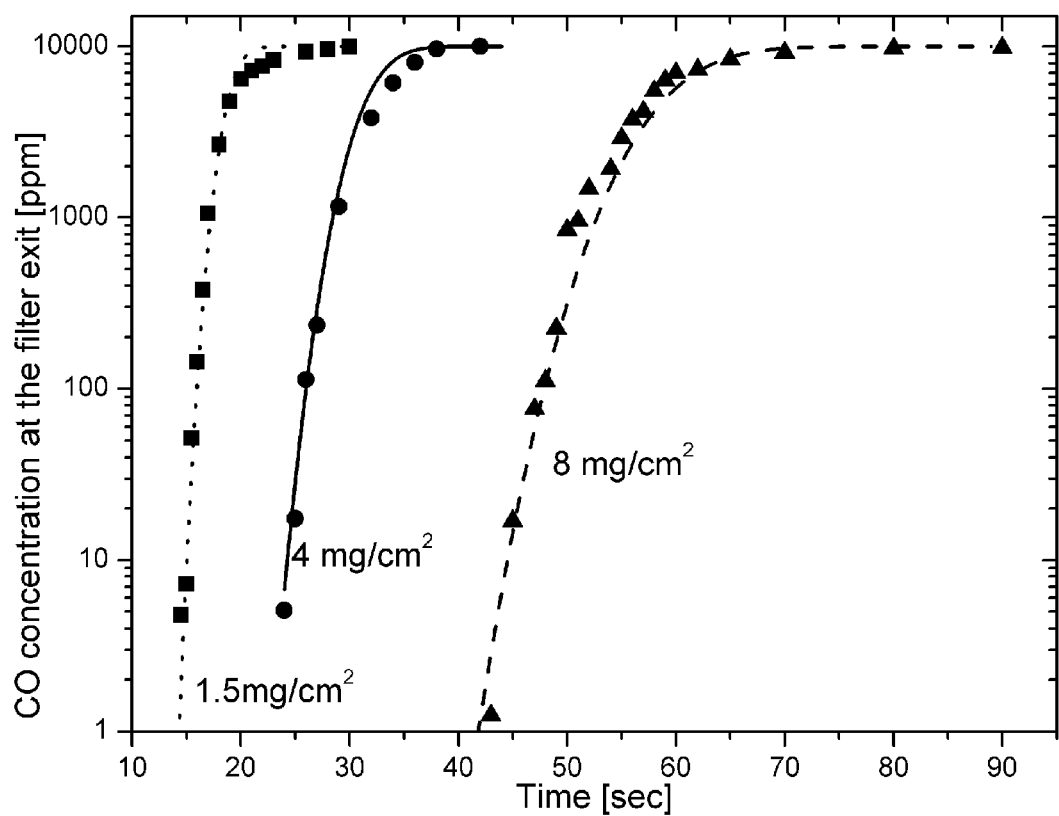
FIG. 8 illustrates CO adsorption break through curves showing the effect of different catalyst loadings for a feed CO concentration of 10000 ppm in hydrogen at 25° C. and 1 atm pressure on a filter cell with an electrode area of 25 cm² (symbols and lines, ■ and dotted—1.5, ● and dashed—4.0 and ▲ and dashed—8.0 mg/cm² represent experimental data and the model fit of the equation 11, respectively) in accordance with certain aspects of the present disclosure.

FIG. 8 shows the BT curves of electrodes with different Pt loadings of 1.5, 4.0 and 8.0 $mg/cm^2$ for an inlet concentration of 10,000 ppm $CO/H_2$ at 25° C. and 1 atm. pressure in an electrode of 25 $cm^2$ area and a flow rate of 100 $cm^3$/min. For the Pt loadings of 1.5, 4.0 and 8.0 $mg/cm^2$, the break through occurred at around 15, 25 and 45 seconds and leveled the inlet concentration at around 30, 43 and 90 seconds, respectively. An increase in Pt loading increases active sites for CO adsorption and the consequent thickness increase could cause increase in pore resistance. However, a single mass transfer coefficient value could fit the curves BT for different catalyst loading as shown in the FIG. 8. The no change in mass transfer resistance even after an increase in pore distance shows that pore or surface diffusion has lesser effect on the overall mass transfer resistance. An increase in Pt loading increases the number of active sites per unit electrode area. The decrease in number of active sites per unit area of electrode with increase in Pt loading shows the inefficiency of packing of active sites at higher loading.

Effect of Temperature—

Figure 9:
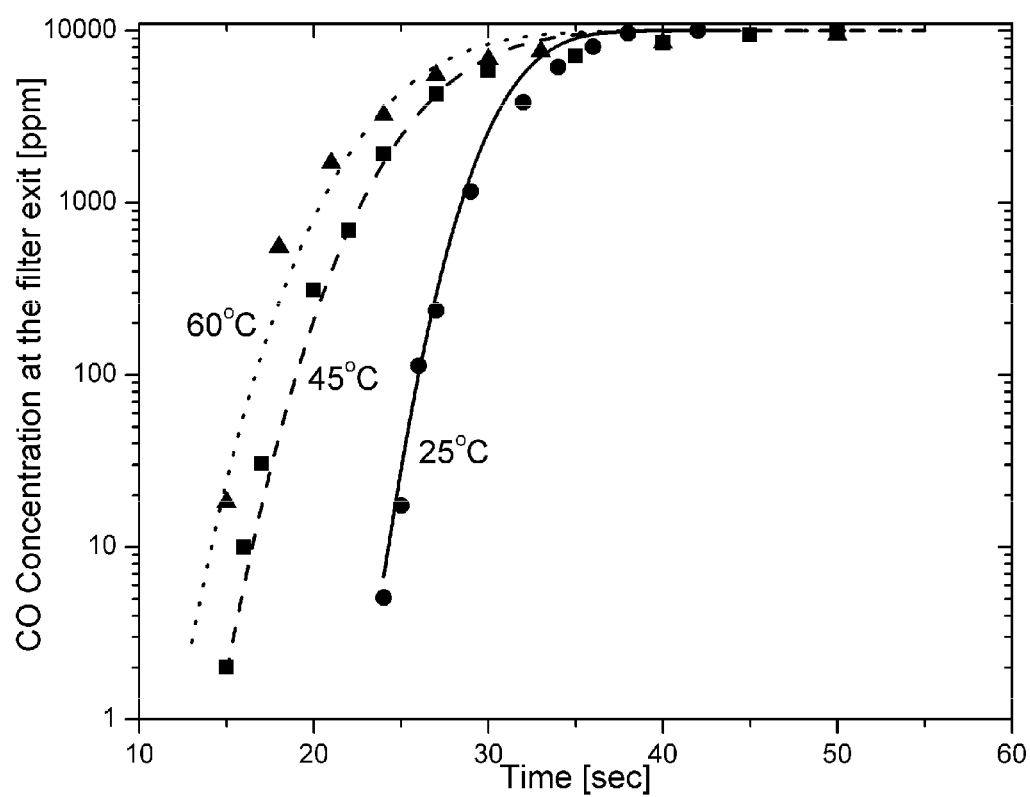
FIG. 9 illustrates CO adsorption break through curves showing the effect of different temperatures for a feed CO concentration of 10000 ppm in hydrogen at 1 atm pressure on a filter cell with an electrode area of 25 cm² and a Pt loading of 4.0 mg/cm$^2$ (symbols and lines, ● and straight—25, ■ and dashed—45 and ▲ and dotted—65° C. represent experimental data and the model fit of the equation 11, respectively) in accordance with certain aspects of the present disclosure.

The FIG. 9 shows the effect of temperature on the CO adsorption breakthrough profile. The 25, 45 and 60° C. adsorption profile shows breakthrough at 25, 16 and 13 seconds. However, the steady state is reached at around 45 seconds in all of the cases. The decrease in breakthrough time with the increase in temperature is partially attributed to the decrease in bed capacity. However, the decrease in slope of BT curves with increase in temperature indicates the temperature affects the overall mass transfer co-efficient. The diffusional resistance of a gas decreases with increase in temperature. This could decrease the overall mass transfer resistance. However with increase in temperature, the mass transfer resistance increased leading to a decrease in the breakthrough time. Therefore, the major contribution to decreasing BT time is due to an increase in the surface reaction resistance to adsorb CO while competing with hydrogen.

Effects of Inert Gas—

Figure 10:
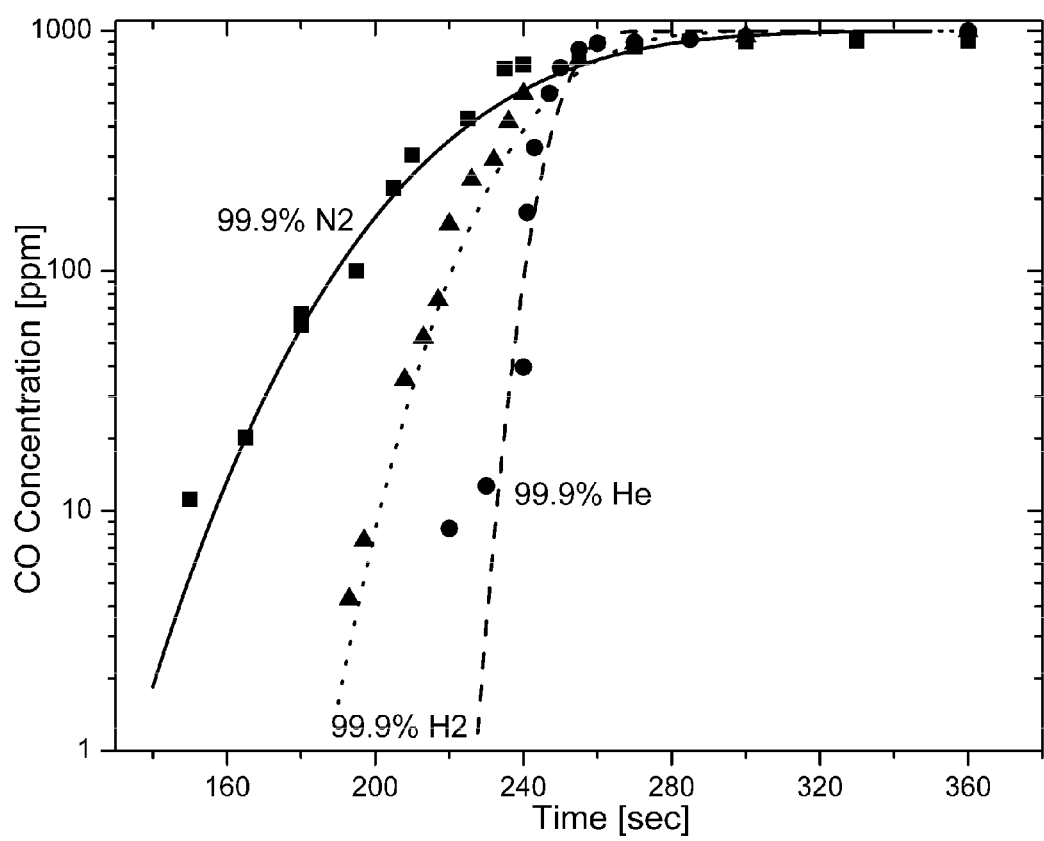
FIG. 10 illustrates CO adsorption break through curves showing the effect of different filler gases for a feed CO concentration of 1000 ppm at 1 atm pressure on a filter cell with an electrode area of 25 cm$^2$ and a Pt loading of 4.0 mg/cm$^2$ (symbols and lines, ■ and straight—CO/N$_2$, ● and dashed—CO/He and ▲ and dotted—CO/H$_2$ represent experimental data and the model fit of the equation 11, respectively) in accordance with certain aspects of the present disclosure.

Hydrogen concentration in reformate will affect the CO adsorption because of its competition with CO to adsorb on the active sites. In addition reformate may also contain $CO_2$, nitrogen ($N_2$) and moisture. While these gases do not compete for active sites, they do offer diffusional resistance. The values of diffusion coefficient for CO in $N_2$, helium (He) and $H_2$ are 0.212, 0.702 and 0.743 $cm^2/s$ at 22° C. and 1 atm. pressure, respectively. FIG. 10 shows the effect on CO adsorption due to different filler gases ($H_2$, He and $N_2$) offering different diffusional resistances for a feed CO concentration of 1000 ppm at 25° C. The $CO/N_2$ break through at 150 seconds and CO/He case break through at 220 seconds. Neither $N_2$, nor He competes for active sites to adsorb. Therefore, the decrease in time to BT for $N_2$ is attributed to the high diffusional resistance experienced by CO in $N_2$ as observed from the low diffusion coefficient for $CO/N_2$. However, BT occurred at 200 seconds for $CO/H_2$ while having a diffusion coefficient more than that of CO/He. This could be because helium does not compete with CO for Pt active sites. However in the hydrogen case, the adsorbed hydrogen needs to be displaced. This slows down the adsorption rate of CO and hence contributes to increase in overall mass transfer resistance.

CO Filter Demonstration—

Figure 11:
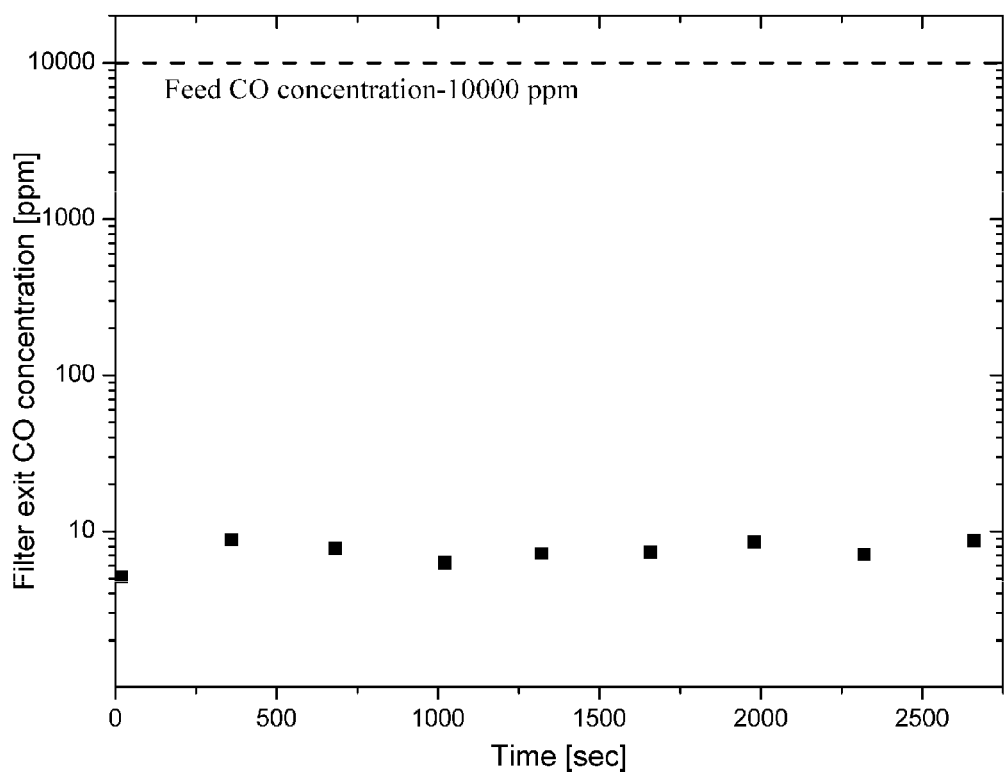
FIG. 11 illustrates the exit CO concentration of a filter operating with a feed CO concentration of 10,000 ppm CO/H$_2$ at 25° C. and 1 atm pressure in accordance with certain aspects of the present disclosure.

A filer cell undergoes alternating cycles of adsorption and oxidation of CO. The adsorption captures CO from reformate as demonstrated by the BT curves and oxidation part oxidizes the adsorbed CO. FIG. 11 shows the CO concentration over a period of time at the exit of the filter removing CO from a gas of 10,000 ppm $CO/H_2$ within a switching time of 20 s at 25° C. and 1 atm. pressure for an electrode loading of 4.0 mg of $Pt/cm^2$. The switching time of 20 s was chosen based on prediction using the lumped mass transfer coefficient estimated from the BT curve. The electrode used for demonstrating the filter operation had 14% lesser active area from the one used for studying BT curves with corresponding loading. This is observed from the decrease in the time to BT at 10 ppm from 23 s to 20 s as is estimated from the mass transfer coefficient estimated from the BT curve data.

Figure 12:
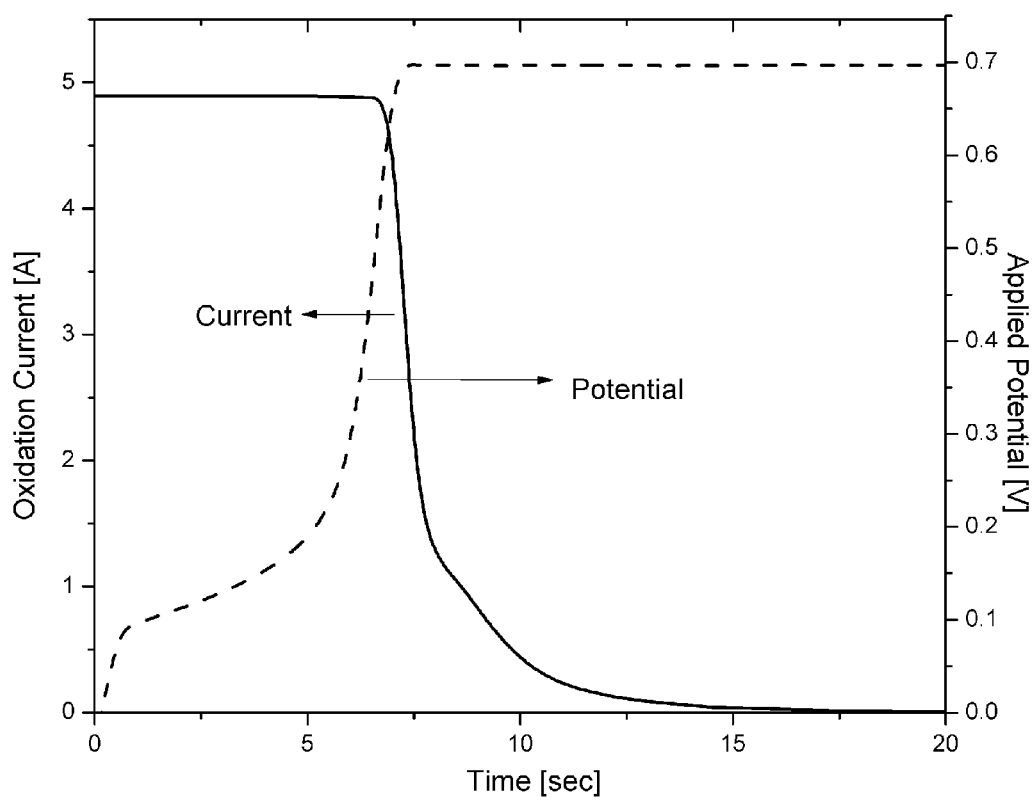
FIG. 12 illustrates oxidation response cycle of a filter operating with a switching cycle of 20 seconds and 0.7 V in accordance with certain aspects of the present disclosure.
Figure 13:
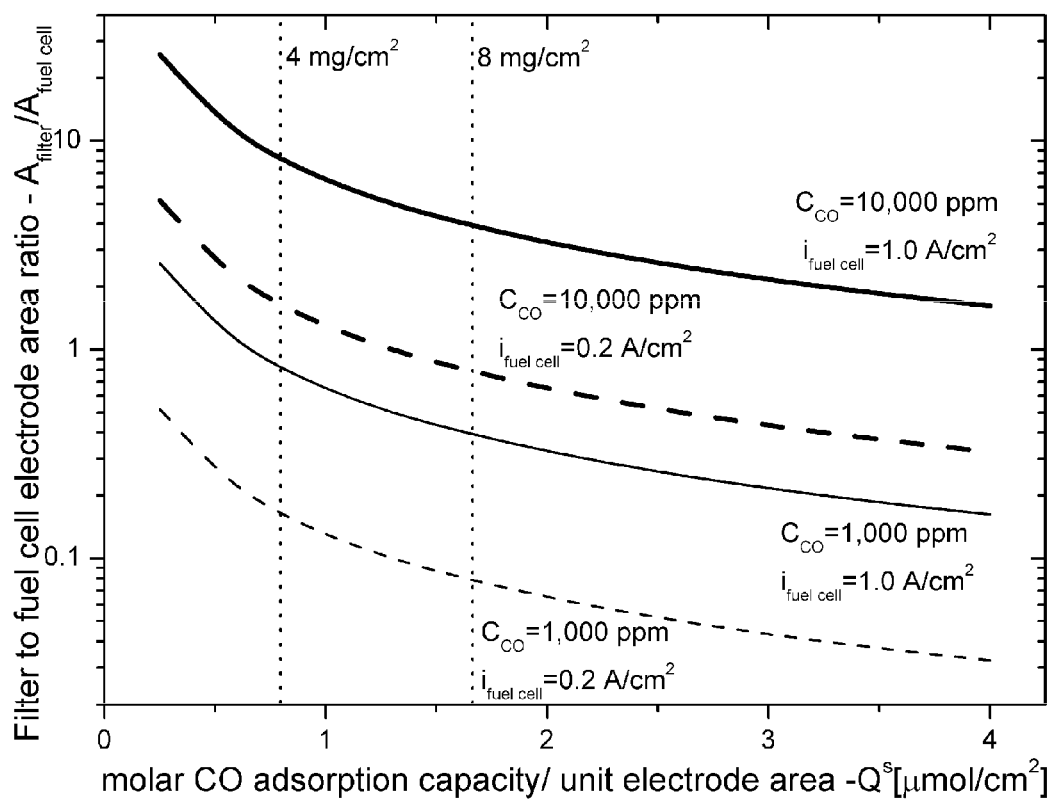
FIG. 13 illustrates the area ration of filter cell to fuel cell required to feed a fuel cell operating at a certain current density and a certain feed concentration required for a given loading of molar active sites per unit electrode area (the vertical line represents the active site loading of the MEA used herein) in accordance with certain aspects of the present disclosure.

FIG. 12 shows the oxidation part of a switching cycle chosen from the current response of a filter operating with a switching time 20 seconds and applied potential 0.7 V. The continuous line shows the current response and dashed line shows the corresponding applied potential. The high current of 5 A correspond to the limitation of the instrument applying potential. The initial high current observed from 0 to 7 seconds is dominated by the oxidation of trapped hydrogen. This is observed from the potential applied during this period which ranges from 0–0.5 V. After the oxidation of the hydrogen the potential increases to 0.7 V at which the CO oxidation starts. This is observed in the decay current, which is a characteristic of the monolayer oxidation current, from 7 to 20 seconds. It can be observed from the figure that the oxidation current reaches a steady state close to zero towards the end of the switching time indicating the absence of oxidizing species at the anode.

During oxidation, the major part of the current is consumed by hydrogen oxidation, which is 82% of the total current consumed, whereas CO oxidation accounts for only 18%. This is equivalent to a loss of 4 $H_2$ molecules for every CO molecule oxidized. For 1000 ppm of feed CO concentration the $H_2$ loss is 5000 ppm. The fuel loss may further be reduced by optimizing the flow channel to minimize the dead volume to active sites ratio. Even with no optimization, for an exit CO concentration level of 10 ppm, the fuel loss in electrochemical filtering compares favorably with other technologies like PSA (8%) and catalytic methanation (11%). The power loss can further be reduced by using air as cathode gas for the filter cell. The oxygen reduction reaction at the cathode can decrease the potential required for the oxidation of CO.

The electrochemical filter offers the possibility of reducing the volume space occupied by the CO handling equipments. For e.g. the volume requirement of a prox unit increases exponentially by 10 times for an exit CO concentration level of 10 ppm in comparison to an exit CO concentration requirement of 250 ppm. A similar result is observed in catalytic methanation. This is due to the thermodynamic stability of CO at low concentrations. This can be overcome by adsorption, which is exploited in electrochemical filter and PSA. For adsorption, the volume requirement scales linearly with the amount of CO adsorbed to be trapped within the switching time and is linear. Because the volume is proportional to the number of active sites, this determines the amount of CO to be trapped. The reformatted gas having higher CO concentration can be treated initially at methanation and prOx reactor which are then fed to an electrochemical filter to bring down the concentration to 10 ppm with a significantly reduced volume. In this work the adsorbent used is Pt, which can adsorb at the maximum of one CO molecule. This is limits the size of filter. The filter size can be further be reduced by alloy catalysts, which can trap more than one CO molecule per active site. This will significantly reduce the size of filter compared to the size of a fuel cell.

The continuous potential cycling can accelerate the corrosion of active sites. A new catalyst that can withstand the continuous potential cycling and with active sites that can hold more than one CO molecule may significantly reduce the power and volume requirements of CO handling equipments for a PEMFC system.

CONCLUSIONS

The CO adsorption breakthrough on a Pt electrode was studied for different experimental conditions. It is observed that the mass transfer is not significantly affected by the feed CO concentration, flow rate and catalyst loading. Observable difference in mass transfer resistance was found while varying the temperature and the filler gas exhibiting different diffusivity. The BT data were fitted against a fixed bed adsorber model to extract the lumped mass transfer coefficient, which is used to predict the suitable switching time for achieving the desired CO concentration at the filter exit. The model was validated by predicting a suitable switching time for an MEA with known active site concentration and mass transfer coefficient. The power and fuel losses associated with the filter operation are compared herein with other technologies and possible roles and future improvements discussed.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure.

What is claimed:

1. A method to reduce CO concentration in reformate $H_2$ comprising:
    directing a flow of reformate $H_2$ to a proton exchange membrane fuel cell comprising:
    a twin-cell electrochemical filter and a relay mechanism, wherein flow of reformate $H_2$ and pulse potential are switched by the relay mechanism between each respective filter cell such that when CO-contaminated $H_2$ is fed to one filter cell, generally simultaneously a pulse potential is applied to the other filter cell, wherein each filter cell receives either a flow of reformate $H_2$ or a pulse potential; but not both, at a given time.

2. The method of claim 1, wherein each of the filter cells comprise anodes.

3. The method of claim 1, wherein each of the filter cells comprise cathodes.

4. The method of claim 1, wherein each of the filter cells comprise membrane electrode assemblies.

5. The method of claim 1, wherein each of the filter cells is configured to oxidize CO when a pulse potential is applied thereto.

6. The method of claim 5, wherein the CO concentration is reduced from the reformate $H_2$.

7. The method of claim 1, wherein the switching takes place in at least 5 second increments.

8. The method of claim 1, wherein the switching takes place in at least 10 second increments.

9. The method of claim 1, wherein the switching takes place in at least 15 second increments.

10. The method of claim 1, wherein the switching takes place in at least 20 second increments.

* * * * *